(12) United States Patent
Wang et al.

(10) Patent No.: US 10,867,412 B2
(45) Date of Patent: Dec. 15, 2020

(54) DATA COMPRESSION BY MEANS OF ADAPTIVE SUBSAMPLING

(71) Applicant: Universität Stuttgart, Stuttgart (DE)

(72) Inventors: Zhe Wang, Gärtringen (DE); Yousef Baroud, Stuttgart (DE); Seyyed Mahdi Najmabadi, Stuttgart (DE); Sven Simon, Ludwigsburg (DE)

(73) Assignee: Universität Stuttgart, Stuttgart (DE)

( * ) Notice: Subject to any disclaimer, the term of this patent is extended or adjusted under 35 U.S.C. 154(b) by 143 days.

(21) Appl. No.: 16/088,022

(22) PCT Filed: Mar. 23, 2017

(86) PCT No.: PCT/EP2017/057011
§ 371 (c)(1),
(2) Date: Sep. 24, 2018

(87) PCT Pub. No.: WO2017/162835
PCT Pub. Date: Sep. 28, 2017

(65) Prior Publication Data
US 2019/0164314 A1 May 30, 2019

(30) Foreign Application Priority Data
Mar. 24, 2016 (DE) .................. 10 2016 003 681

(51) Int. Cl.
*G06T 9/00* (2006.01)
*H04N 19/176* (2014.01)
(Continued)

(52) U.S. Cl.
CPC .............. *G06T 9/00* (2013.01); *G06F 17/18* (2013.01); *G06T 3/40* (2013.01); *G06T 7/0002* (2013.01);
(Continued)

(58) Field of Classification Search
CPC ........... G06T 9/00; G06T 3/40; G06T 7/0002; G06T 2207/20076; H04N 19/11;
(Continued)

(56) References Cited

U.S. PATENT DOCUMENTS 8,542,265 B1 * 9/2013 Dodd ..................... H04N 7/15
348/14.08
9,131,202 B1 * 9/2015 Espeset ................ H04N 9/8045
(Continued)

OTHER PUBLICATIONS

Chou, Chun-Hsien et al.: "A perceptually tuned subband image coder based on the measure of just-noticeable-distortion profile." (In: IEEE Transactions on Circuits and Systems for Video Technology, vol. 5, No. 6, pp. 467-476, 1995).
(Continued)

*Primary Examiner* — Ali Bayat
(74) *Attorney, Agent, or Firm* — Shook, Hardy & Bacon L.L.P.

(57) ABSTRACT

The invention relates to the coding and decoding of data, in particular for visual representation. For this, a method (100) is provided for coding an initial data set (110), in which a respective initial data value (P1, P2, P3, P4) is established for a respective plurality of initial data points (112), for generating a compressed data set (114), comprising a primary coding of the initial data set (110) to generate an intermediate data set (116) and a secondary coding of the intermediate data set (116) to generate the compressed data set (114). In this way, the primary coding comprises the following steps: establishing a plurality of data point blocks (118), each having a plurality of initial data points (112) of the initial data set (110); determining a block data value (120) for each data point block (118) from the plurality of initial data values (P1, P2, P3, P4) within the respective data point block (118); checking each data point block (118) for compliance with a tolerance criterion; and generating the
(Continued)

Figure 3:
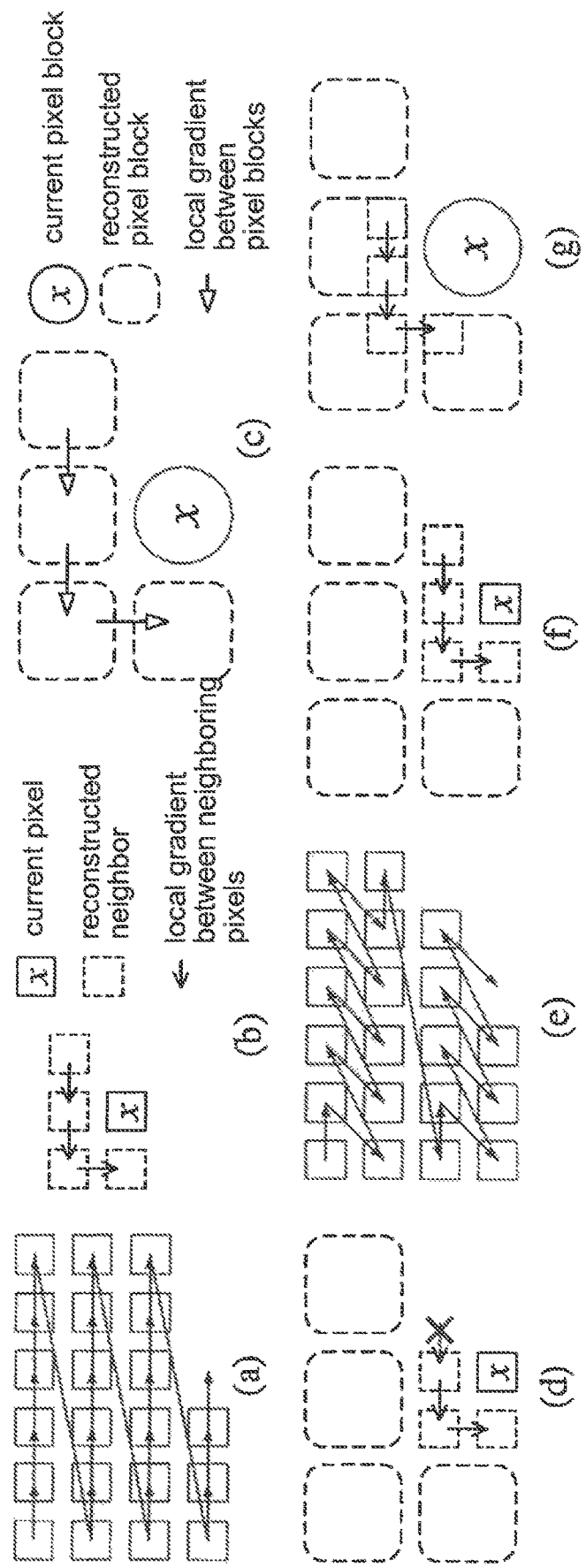

intermediate data set (116) in such a way that the intermediate data set (116) contains the block data value (120) as an individual data value for each data point block (118) in which the tolerance criterion is observed, and same contains the individual initial data values (P1, P2, P3, P4) at the initial data points (112) of the respective data point block (118) for each data point block (118) in which the tolerance criterion is not observed.

14 Claims, 2 Drawing Sheets

(51) Int. Cl.
<table>
<tr><td>H04N 19/59</td><td>(2014.01)</td></tr>
<tr><td>H04N 19/132</td><td>(2014.01)</td></tr>
<tr><td>H04N 19/154</td><td>(2014.01)</td></tr>
<tr><td>H04N 19/182</td><td>(2014.01)</td></tr>
<tr><td>H04N 19/593</td><td>(2014.01)</td></tr>
<tr><td>G06F 17/18</td><td>(2006.01)</td></tr>
<tr><td>G06T 3/40</td><td>(2006.01)</td></tr>
<tr><td>G06T 7/00</td><td>(2017.01)</td></tr>
</table>

(52) U.S. Cl.
CPC ......... *H04N 19/132* (2014.11); *H04N 19/154* (2014.11); *H04N 19/176* (2014.11); *H04N 19/182* (2014.11); *H04N 19/59* (2014.11); *H04N 19/593* (2014.11); *G06T 2207/20076* (2013.01)

(58) Field of Classification Search
CPC .. H04N 19/132; H04N 19/154; H04N 19/176; H04N 19/182; H04N 19/59; H04N 19/593; H04N 19/105
USPC ......................................................... 382/251
See application file for complete search history.

(56) References Cited

U.S. PATENT DOCUMENTS

<table>
<tr><td>2007/0160305 A1*</td><td>7/2007</td><td>Demos</td><td>H04N 19/13<br>382/244</td></tr>
<tr><td>2009/0092325 A1*</td><td>4/2009</td><td>Brown Elliott</td><td>G09G 3/20<br>382/232</td></tr>
<tr><td>2012/0294358 A1</td><td>11/2012</td><td>Suzuki et al.</td><td></td></tr>
<tr><td>2013/0076937 A1*</td><td>3/2013</td><td>Tajima</td><td>H04N 5/2355<br>348/223.1</td></tr>
<tr><td>2015/0043034 A1*</td><td>2/2015</td><td>Yamazaki</td><td>G06K 15/1836<br>358/1.15</td></tr>
<tr><td>2015/0117791 A1*</td><td>4/2015</td><td>Mertens</td><td>H04N 19/17<br>382/239</td></tr>
<tr><td>2016/0360231 A1*</td><td>12/2016</td><td>Yuan</td><td>H04N 19/85</td></tr>
<tr><td>2017/0223367 A1*</td><td>8/2017</td><td>Stessen</td><td>H04N 1/6027</td></tr>
</table>

OTHER PUBLICATIONS

Yang, X. K. et al.: "Just-noticeable-distortion profile with nonlinear additivity model for perceptual masking in color images." (In: IEEE International Conference on Acoustics, Speech, and Signal Processing, Proceedings, vol. 3, pp. III-609-12, 2003).

Liu, A. et al.: "Just noticeable difference for images with decomposition model for separating edge and textured regions." (In: IEEE Transactions on Circuits and Systems for Video Technology, vol. 20, No. 11, pp. 1648-1652, 2010).

Weinberger, Marcelo et al.: "The LOCO-I lossless image compression algorithm: principles and standardization into JPEG-LS." (In: IEEE Transactions on Image Processing, vol. 9, No. 8, pp. 1309-1324, 2000).

Wu, X. et al.: "Context-based, adaptive, lossless image coding." (In: IEEE Transactions on Communications, vol. 45, No. 4, pp. 437-444, 1997).

Howard, Paul G. et al.: "Fast and efficient lossless image compression." (In: Data Compression Conference, pp. 351-360, 1993).

Wang, Z. et al.: "SSPQ—spatial domain perceptual image codec based on subsampling and perceptual quantization" (In: 19th IEEE International Conference on Image Processing, Orlando, FL, pp. 1061-1064, 2012).

Belfor, Ricardo A. F. et al.: "Spatially adaptive subsampling of image sequences." (In: IEEE Transactions on Image Processing, vol. 3, No. 5, pp. 492-500, 1994).

Sullivan, Gary J. et al.: "Overview of the High Efficiency Video Coding (HEVC) Standard" (In: IEEE Transactions on Circuits and Systems for Video Technology, vol. 22, No. 12, pp. 1649-1668, 2012).

International Search Report and Written Opinion dated Jun. 8, 2017 in International Patent Application No. PCT/EP2017/057011, 10 pages.

* cited by examiner

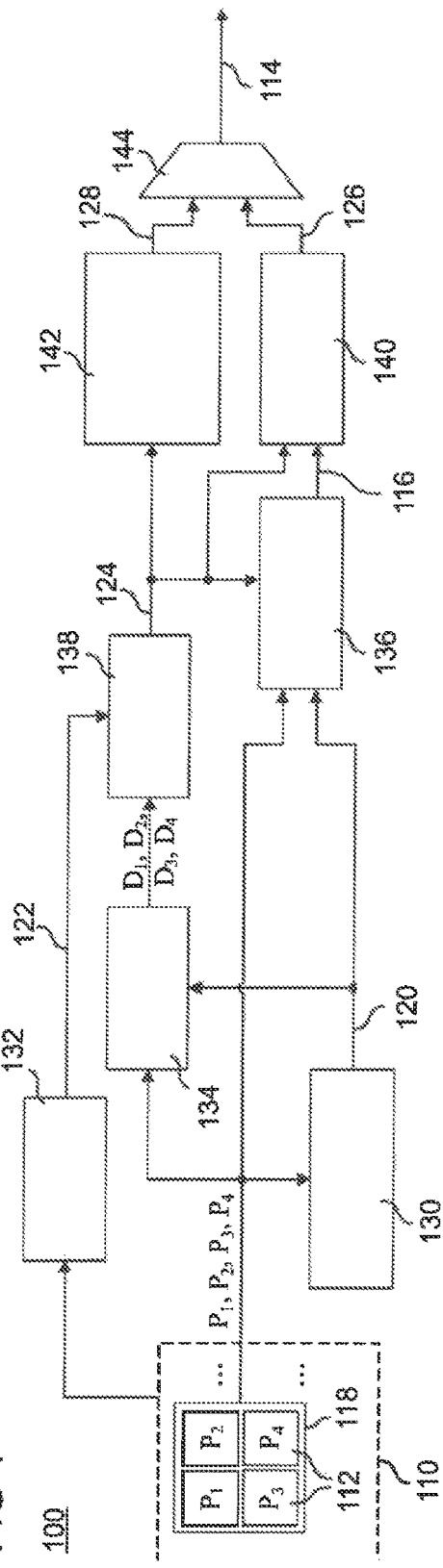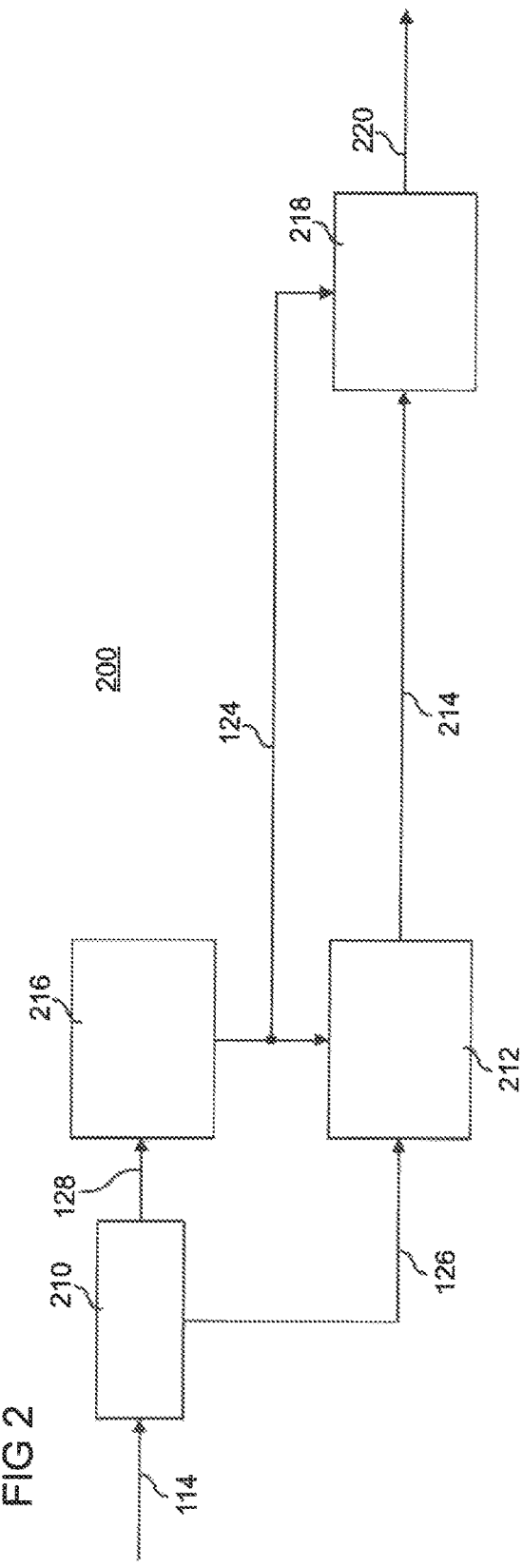

DATA COMPRESSION BY MEANS OF ADAPTIVE SUBSAMPLING

CROSS-REFERENCE TO RELATED APPLICATIONS AND PRIORITY CLAIM

This Non-Provisional Patent Application submitted under 35 U.S.C. 371 claims priority to co-pending PCT Patent Application No. PCT/EP2017/057011, filed Mar. 23, 2017, and titled "Data Compression by Means of Adaptive Subsampling," which claims priority to German Patent Application No. 102016003681.8, filed Mar. 24, 2016, and titled "Datenkompression mittels adaptiven Unterabtastens." The contents of each of these applications is incorporated herein by reference in the entirety.

The present invention relates to a method and an apparatus for data compression of image data with low losses in perceptual image quality.

Particularly due to the ever-increasing popularity of digital camera systems with ever higher resolutions, i.e. ever larger image files, the demands on the performance of the data processing systems, in particular with regard to data transmission rate and storage space, are also becoming ever greater. One way to still process and archive even larger amounts of image data is the use of data compression methods.

The compression of image data is based on either converting the original data into a completely reconstructable form, which requires less storage space (lossless compression), or removing data whose loss is not or hardly noticeable (lossy compression).

In lossless compression, no information is lost. The data is simply formatted or encoded so as to take up less space in common storage systems. That is, redundancies are detected and eliminated. Established examples of lossless compression are the graphic formats PNG and GIF. Unlike GIF, PNG uses additional predictive coding (also called "pre-filter" in PNG). Here, the next color values are predicted from empirical values and only the deviations of the prediction from the actual image information are stored. This often leads to a better compression factor in PNG than in GIF. However, a good compression factor can often only be achieved if the images are favorable for a respective compression algorithm. This means that they should have the largest possible areas, each with the same color or the same pattern, in PNG possibly also with color gradients. Further lossless compression methods are, for example, Lossless JPEG, Lossless JPEG 2000 and JPEG-LS, which sometimes achieve quite good compression rates even for more complex images.

Even better compression rates can usually be achieved with lossy compression. In this case, a loss of information is accepted, which in the representation of the image is as inconspicuous as possible though. For example, one can take advantage of the fact that sufficiently small color changes are not visible to the human eye. Similar to lossy audio compression, image compression is based on a model of human perception. In contrast to lossless compression, not only information-technically truly redundant information, but also information that merely go beyond the receptivity of human image perception, is regarded as redundancies in lossy compression and is removed in the encoded (compressed) format as far as possible. However, which information can be regarded as redundancies depends on the perceptual model. In contrast to audio compression, however, visual perception models are not explicitly and uniformly formulated and incorporated into the algorithms, but are more intuitive or subjective. In particular, they may differ between different compression methods.

Examples of lossy data compression are JPEG and JPEG 2000. In this case, a transformation of a source data set (image) by means of a system of basic functions is carried out. For JPEG, this is the Discrete Cosine Transform (DCT), for JPEG 2000 the wavelet transform. In this way one obtains another, equivalent representation of the image, which consists of the coefficients for these basis functions. For JPEG, these are the amplitudes of the so-called spatial frequencies, for JPEG 2000 a kind of averages over 4, 16, 64, . . . pixels. These coefficients are changed by quantization. Small coefficients disappear completely and the larger ones are set to the next best quantization value. In this way, they can be represented with fewer bits. Finally, lossless data compression is often still carried out to remove true redundancies from the result of transformation and quantization. Regardless of the possible use of a transform in coding, quantization plays an important role in the reduction of data in many lossy data compressions. Often it is possible to set a quantization error (i.e., the distance of the quantization steps) directly or indirectly as parameters in order to influence the compression rate. The larger the allowed quantization error, the higher the compression rate as a rule. However, this also increases the loss of data, and visible deviations (artifacts) from the original data set (e.g., original image) arise in the reconstructed data set (e.g., image).

Another known example of data compression is JPEG-LS. For example, this method is set forth in ISO/IEC 14495-1 as one of the newest standards and provides both lossless and lossy modes. JPEG-LS offers a very good balance between the complexity of the algorithm (i.e., the computation time) and the compression rate, not least due to the fact that unlike e.g. JPEG or JPEG 2000, it does not operate in the transform domain, but in the pixel domain of the initial data (e.g., original image). However, JPEG-LS has limits in terms of the compression rate on the one hand and the appearance of visible quality losses (artifacts) on the other hand, which renders also this standard not completely superior to the older standards JPEG and JPEG 2000. Particularly in the case of comparatively homogeneous image areas with little color and/or brightness changes, appreciable stripes often appear as artifacts in JPEG-LS.

It is therefore an object of the present invention to improve the coding and decoding of data sets for the visual representation in such a way that even with a good compression rate, in particular the visual recognizability of data losses is kept low or reduced.

This object is achieved by a method and a system for encoding as well as a method and a system for decoding with the features specified in the independent claims. Preferred embodiments are subject of the dependent claims.

Thus, in one aspect, the invention particularly relates to a method of encoding (compressing) an initial data set (source data set). This may be, for example, an uncompressed (original) image. In particular, the initial data set defines a preferably multi-dimensional data room in which an initial data value (e.g., brightness and/or hue) is specified for each of a plurality of initial data points (e.g., pixels, voxels). The invention is not limited to the application for photos. Other data sets, which for example specify measured sensor data for a temperature distribution (thermographic data), an electric and/or magnetic field distribution or other measured variables (for example tomography data), in particular for visual representation, can also benefit from the present invention. This initial data set is coded by the inventive method of generating a compressed data set.

Here, the method according to the invention particularly comprises lossy primary coding (compression) of the initial data set for generating an intermediate data set and secondary coding (compression) of the intermediate data set for generating the compressed data set.

Here, the primary coding comprises specifying a plurality of, in particular, non-overlapping data point blocks, each of which comprises a plurality of initial data points of the initial data set. Preferably, (at least outside an edge region of the initial data points) the data point blocks comprise the same number of initial data points. Particularly preferably, these data point blocks substantially also have the same shape. In a preferred embodiment, the data point blocks are rectangular, in particular square, in the sense that each data point block comprises m×n or n×m or n×n initial data points (pixels), where m is a natural number and n is a natural number greater than or equal to 2. In particular square blocks are relatively easy to process and comparatively universally usable. In particular in a special situation, however, another, arbitrary shape or pixel number can be used for each data point block. In particular, in special cases, a data point block could even specify a non-contiguous area of initial data points (pixels).

In addition, the primary coding comprises determining a (single) block data value (as a representative value) for each data point block from the plurality of initial data values within the respective data point block. Preferably, the block data value is determined based on a function of all initial data values within the respective data point block. Here, the same function is preferably used for all (equally large) data point blocks. For example, the (arithmetic) mean value of all the initial data values within the respective data point block is determined as the block data value. In another preferred embodiment, the median (central value) of all the initial data values within the respective data point block is determined as the block data value. At least these two values can be determined with little computational effort on the one hand, and are also very well suited to keep the (visual) quality losses of the coding process low on the other hand.

The primary coding also comprises checking each data point block for compliance with a tolerance criterion. Here, it is checked in particular (directly or indirectly) whether the determined block data value within a given tolerance criterion is a sufficiently good representative for all initial data values in the respective data point block. To this end, all initial data values within a data point block can be compared with a (respective) reference value and it can be checked whether a deviation of each initial data value from the (respective) reference value is below a (respective) threshold, i.e. within a (respective) tolerance value. In a preferred embodiment, the tolerance criterion may be based on a probability function. In particular, the tolerance criterion may be implemented by means of a fuzzy logic function.

Depending on the result of this check, the primary coding comprises generating the intermediate data set such that the intermediate data set, for each data point block in which the tolerance criterion is met, contains the block data value as a single (representative) data value, and for each data point block in which the tolerance criterion is not met, contains the individual initial data values at the initial data points of the respective data point block. The intermediate data set can therefore be significantly more compact (less data) than the initial data set, since at least for those data point blocks in which the block data value is a sufficiently good representative for the entire data point block, the data volume is reduced at least by the ratio of the size of the data point block (number of initial data points within of the data point block). However, the resulting compression rate is adaptive in the pixel domain and can thus very efficiently control or suppress detectable data losses (artifacts). To this end, the tolerance criterion (i.e. in particular the permissible deviations or distortions) for checking each data point block is preferably adjusted on the basis of a correspondingly desired perception model.

In the subsequent secondary coding process, redundancies still contained in the intermediate data set are preferably at least partially removed. After a significant data reduction has already been achieved in primary coding, the criteria for the secondary coding process can be chosen to be comparatively strict with regard to possible further quality losses. This means that even with a lossless or low-loss secondary coding, overall a good compression rate is still achieved. Even if the requirements for the compression rate are not too high (i.e. the data reduction is low), conventional, lossy coding methods often achieve a rather high quality and the tendency to form recognizable artifacts is low. Particularly in the case of JPEG-LS coding in lossy mode, the tendency to form artifacts can be suppressed by correspondingly high quality requirements in the choice of parameters (e.g. the selection of a correspondingly low quantization error). Thus, the present invention achieves a reduction particularly of the visual recognizability of data losses even at a good compression rate.

For example, even though it is basically possible to specify a global tolerance value that is equally applicable to all data point blocks and in particular to all initial data points or initial data values, which in particular results in very fast coding, it is particularly preferred with regard to high quality and compression rate if checking each data point block for compliance with the tolerance criterion comprises determining a tolerance value for each initial data point. In particular, a separate tolerance value (also referred to as "just-noticeable distortion" JND in particular in photo or image processing) is determined for each initial data point. Preferably, this tolerance value is determined for each initial data point as a function of the initial data values of adjacent initial data points. Thus, the perceptibility of corruption of the data in a data point depends on the environment of that data point as a rule. For example, it is particularly preferred to determine the tolerance value for each initial data point as a function of the initial data values of preferably at least 8, more preferably at least 24, adjacent initial data points (in particular the 8 or 24 nearest neighbors).

Similar fundamental considerations on environment-dependent perceptual limits, i.e. JND values, are already described e.g. in [C.-H. Chou und Y.-C. Li, "A perceptually tuned subband image encoder based on the measure of just-noticeable-distortion profile" IEEE Trans. Circuits Syst. Video Technol., vol. 5, no. 6, pp. 467-476, December 1995], [X. Yang, W. Lin, Z. Lu, E. Ong, und S. Yao, "Just-noticeable-distortion profile with nonlinear additivity model for perceptual masking in color images", in Acoustics, Speech, and Signal Processing, 2003. Proceedings. (ICASSP '03). 2003 IEEE International Conference on, vol. 3, April 2003, pp. III-609-12 vol. 3] und [A. Liu, W. Lin, M. Paul, C. Deng, und F. Zhang, "Just noticeable difference for images with decomposition model for separating edge and textured regions", IEEE Trans. Circuits Syst. Video Technol., vol. 20, no. 11, pp. 1648-1652, November 2010] and have been found to be particularly advantageous in the context of the present invention. For example, a tolerance value $$JND(i,j) = \max\{f_1[bg(i,j), mg(i,j)], f_2[bg(i,j)]\} \quad (1)$$

for an initial data point with the coordinates (i,j) and the initial data value p(i,j) has turned out to be very efficient, wherein the functions $f_1$ and $f_2$ describe models for a texture masking effect or luminance masking effect in particular according to [C.-H. Chou and Y.-C. Li, "A perceptually tuned subband image encoder based on the measure of just-noticeable-distortion profile" IEEE Trans. Circuits Syst. Video Technol., vol. 5, no. 6, pp. 467-476, December 1995]. Here, it preferably holds that:

$$bg(i, j) = \frac{1}{32} \sum_{m=1}^{5} \sum_{n=1}^{5} p(i-3+m, j-3+n) \cdot B(m, n) \quad (2)$$

with $$B = \begin{pmatrix} 1 & 1 & 1 & 1 & 1 \\ 1 & 2 & 2 & 2 & 1 \\ 1 & 2 & 0 & 2 & 1 \\ 1 & 2 & 2 & 2 & 1 \\ 1 & 1 & 1 & 1 & 1 \end{pmatrix} \quad (3)$$

and $$mg(i, j) = \max_{k=1,2,3,4} |grad_k(i, j)| \quad (4)$$

with $$grad_k(i, j) = \frac{1}{16} \sum_{m=1}^{5} \sum_{n=1}^{5} p(i-3+m, j-3+n) \cdot G_k(m, n) \quad (5)$$

where $$G_1 = \begin{pmatrix} 0 & 0 & 0 & 0 & 0 \\ 1 & 3 & 8 & 3 & 1 \\ 0 & 0 & 0 & 0 & 0 \\ -1 & -3 & -8 & -3 & -1 \\ 0 & 0 & 0 & 0 & 0 \end{pmatrix} \quad (6a)$$

$$G_2 = \begin{pmatrix} 0 & 0 & 1 & 0 & 0 \\ 0 & 8 & 3 & 0 & 0 \\ 1 & 3 & 0 & -3 & -1 \\ 0 & 0 & -3 & -8 & 0 \\ 0 & 0 & -1 & 0 & 0 \end{pmatrix} \quad (6b)$$

$$G_3 = \begin{pmatrix} 0 & 0 & 1 & 0 & 0 \\ 0 & 0 & 3 & 8 & 0 \\ -1 & -3 & 0 & 3 & 1 \\ 0 & -8 & -3 & 0 & 0 \\ 0 & 0 & -1 & 0 & 0 \end{pmatrix} \quad (6c)$$

$$G_4 = \begin{pmatrix} 0 & 1 & 0 & -1 & 0 \\ 0 & 3 & 0 & -3 & 0 \\ 0 & 8 & 0 & -8 & 0 \\ 0 & 3 & 0 & -3 & 0 \\ 0 & 1 & 0 & -1 & 0 \end{pmatrix} \quad (6d)$$

In addition, checking each data point block for compliance with the tolerance criterion preferably comprises determining (calculating or specifying or defining) a reference value for each initial data point at least as a function of the determined block data value of at least the respective data point block.

In a preferred embodiment, the block data value is used for each data point block as a reference value for each initial data point within the respective data point block. This type of determination of the reference value is very efficient both in terms of the computation time and in terms of storage requirements. In particular, no complex computational operation has to be carried out for this purpose. Instead, all reference values of the initial data points within a data point block are already available when the block data value is determined. In addition, it is not necessary in this case to store a reference value for each initial data point. Instead, the single (common) reference value can be used for all initial data points, which is stored e.g. only once and then referenced for each initial data point.

In another preferred embodiment, a separate reference value is determined for each initial data point in a data point block. This can be done, for example, as a function of block data values of adjacent data point blocks, in particular by interpolation. In a sense, it is thus attempted to reconstruct (approximately) the original initial data values from the block data values e.g. by interpolation. Although this procedure for determining the reference values requires more computing time, it can lead to an improvement in the quality and/or the compression rate in individual cases. Particularly preferably, in the case of the determination of individual reference values, use is made of the same algorithm for each initial data point as is particularly suitable for later decoding for reconstructing the values at the individual data points. Thus, preferably the expected result of a later decoding is temporarily anticipated.

Based on the (either global or local) determined tolerance value and the reference value determined, checking each data point block for compliance with the tolerance criterion preferably comprises checking each initial data point within the data point block as to whether a deviation of the associated initial data value from the respective reference value is within the respective tolerance value. Particularly preferably, the tolerance criterion is considered to be met if and only if the deviations of a plurality of initial data values, more preferably all initial data values in the respective data point block, are within the respective tolerance value.

In another preferred embodiment, checking each data point block for compliance with a tolerance criterion comprises generating a block evaluation data set which defines for each data point block whether the tolerance criterion is met to or not. Since the block evaluation data set preferably does not have to carry more information than the binary statement for each data point block as to whether the respective data point block complies with the tolerance criterion or not, the block evaluation data set preferably has to provide only one bit for each data point block and therefore requires comparatively little storage space or little transmission capacity. The block evaluation data set can therefore specify an allocation (a mapping) of the data contents of the intermediate data set to the initial data points with only a small memory requirement. This assignment information thus does not have to be contained (explicitly) in the intermediate data set.

Preferably, secondary coding (compressing) the intermediate data set to generate the compressed data set comprises first secondary coding of the intermediate data set to generate a compressed intermediate data set, second secondary coding of the block evaluation data set to generate a compressed block evaluation data set, and multiplexing (or bundling) of the compressed intermediate data set with the compressed block evaluation data set to generate the compressed data set. Such (temporary) separation of the block evaluation data set from the intermediate data set, wherein the intermediate data set directly or indirectly specifies the actual data values (color, brightness, color change or the like) and the block evaluation data set defines an assignment of the data values to the data points (coordinates, pixels), makes it possible to implement also the first secondary coding and the second secondary coding as independent coding processes. This is particularly advantageous in that the two secondary coding processes can be adapted to the different data structure of the intermediate data set and of the block evaluation data set in order to achieve the best possible compression rate. For example, it is particularly preferred if the second secondary coding takes place loss-free so as to avoid losing any information about the assignment of the data values to the data points. On the other hand, the first secondary coding can be quite lossy, and thus improve the compression rate.

In a preferred embodiment, the secondary coding (especially the first secondary coding) of the intermediate data set comprises lossy compression by quantizing (data values) with a local quantization error determined for each data point block in dependence on the block evaluation data set. This makes it possible to efficiently control data losses adaptively depending on the previously defined tolerance criterion. Since very effective data reduction has already taken place in primary coding, it is no longer necessary to allow high losses (for example due to high quantization errors) in secondary coding in order to ultimately achieve a good compression rate. In addition, adaptive quantization, that is, local dependency on the block evaluation data set, can be used to suppress unwanted artifacts. For example, the very often disturbing quantization artifacts in areas of only minor color and/or brightness changes in JPEG LS can be suppressed very efficiently by the fact that such areas in the block evaluation data set are defined as non-sensitive data point blocks (also called "non-ROI"), which comply with the tolerance criterion and are represented very well by a single block data value. This information in the block evaluation data set can be used in the (first) secondary coding process to control the quantization parameter (quantization error) in order to keep the quantization error there low or even eliminate it. Thus, such areas are preferably coded in a lossless manny, while other areas in which the quantization does not cause such clearly recognizable artifacts can be coded in a lossy manner in favor of a higher compression rate.

This advantage of adaptive quantization comes into play in particular in secondary coding methods in which the quantization for data values takes place in the pixel domain, which is why, at least in this regard, pixel domain codings are preferable over the transform domain codings for the (first) secondary coding. Possible examples of particularly preferred encoders for the (first) secondary coding are:

JPEG-LS, published as ISO standard and ITU-T recommendation: ISO/IEC 14495-1:19991 ITU-T Rec. T.87, June 1998, LOCO-I, published by M. J. Weinberger, G. Seroussi and G. Sapiro, "The LOCO-I lossless image compression algorithm: principles and standardization into JPEG-LS," in IEEE Transactions on Image Processing, vol. 9, no. 8, pp. 1309-1324, August 2000, CALIC, published by X. Wu and N. Memon, "Context-based, adaptive, lossless image coding," in IEEE Transactions on Communications, vol. 45, no. 4, pp. 437-444, April 1997, FELICS, published by P. G. Howard and J. S. Vitter, "Fast and efficient lossless image compression," Data Compression Conference, 1993. DCC '93, Snowbird, U T, 1993, pp. 351-360, PNG, published as ISO standard: ISO/IEC 15948:2004, March 2004

In another aspect, the present invention relates to a system for encoding an initial data set in which an initial data value is specified for each of a plurality of initial data points, for generating a compressed data set, comprising:

a primary encoder for encoding the initial data set for generating an intermediate data set, comprising:
 a block generation module for specifying a plurality of data point blocks which each comprise a plurality of initial data points of the initial data set;
 a block value determination module for determining a block data value for each data point block from the plurality of initial data values within the respective data point block;
 a block check module for checking each data point block for compliance with a tolerance criterion; and
 a composition module for generating the intermediate data set in such a way that the intermediate data set, for each data point block in which the tolerance criterion is met, contains the block data value as a single data value, and for each data point block in which the tolerance criterion is not met, contains the individual initial data values at the initial data points of the respective data point block; and
a secondary encoder for encoding the intermediate data set for generating the compressed data set.

Both the primary encoder with the block generation module, the block value determination module, the block check module and the composition module as well as the secondary encoder can be partially or completely implemented as hardware components or as software modules, depending on the application.

Preferably, the system is designed to implement a method of encoding according to the present invention, in particular in one of the preferred embodiments described herein. Thus, the block check module preferably comprises a tolerance value determination module for determining a tolerance value for each initial data point. In addition, the block check module particularly preferably comprises a reference value determination module for determining a reference value for each initial data point at least as a function of the determined block data value of at least the respective data point block. In a preferred embodiment, the block check module further comprises a deviation determination module for determining deviations of the initial data values from the respective reference value. In addition, the block check module preferably includes a block evaluation module for checking each initial data point within the data point block as to whether a deviation of the associated initial data value from the respective reference value is within the respective tolerance value. Preferably, the block evaluation module is designed to generate a block evaluation data set which specifies or identifies for each data point block whether the tolerance criterion is met to or not.

Preferably, the secondary encoder comprises:
 a first secondary encoder for first secondary coding of the intermediate data set to generate a compressed intermediate data set;
 a second secondary encoder for second secondary coding of the block evaluation data set to generate a compressed block evaluation data set; and
 a multiplexer (or more generally a combiner module) for multiplexing (or combining or bundling) the compressed intermediate data set with the compressed block evaluation data set to generate the compressed data set.

In another aspect, the present invention provides a method of decoding a compressed data set generated in particular by a method of encoding according to the present invention, in particular in one of the preferred embodiments described herein, for generating a reconstructed initial data set in which for each of a plurality of initial data points one reconstructed initial data value $P^*_1$, $P^*_2$, $P^*_3$, $P^*_4$ is specified. Here, the reconstructed initial data set approximates the original initial data set, whereby deviations can occur due to the lossy coding. The method comprises secondary decoding of the compressed data set to generate a reconstructed intermediate data set, which specifies a plurality of intermediate data values, and a block evaluation data set, which specifies, for each intermediate data value, an assignment rule (mapping) as to whether it represents a single initial data point of the initial data set to be reconstructed or a data point block, which comprises a plurality of initial data points of the initial data set to be reconstructed. This decoding is referred to herein as "secondary" decoding to illustrate its correspondence to "secondary" coding in accordance with a coding method also described herein. In particular, the decoding algorithms corresponding to the secondary coding are used here. In the reconstructed intermediate data set, a part of the plurality of intermediate data values may each represent a representative for a single initial data value to be reconstructed, while another part of the plurality of intermediate data values each represents a representative for a plurality of initial data values to be reconstructed, in particular belonging to a data point block.

In addition, the method comprises a primary decoding of the reconstructed intermediate data set to generate the reconstructed initial data set in accordance with the assignment rules defined in the block evaluation data set. Thus, preferably those intermediate data values representing exactly one initial data point are directly used as the corresponding reconstructed initial data value. For those data point blocks represented by a single reconstructed intermediate data value, the corresponding reconstructed initial data values are derived from the single reconstructed intermediate data value, preferably also taking into account the reconstructed intermediate data values and/or the reconstructed initial data values for adjacent initial data points. This can be accomplished, for example, by simply copying the corresponding reconstructed intermediate data value or by interpolation. This decoding is referred to herein as "primary" decoding to clarify its correspondence to "primary" coding according to a coding method also described herein.

Preferably, secondary decoding comprises:
  extracting a compressed block evaluation data set and a compressed intermediate data set from the compressed data set (for example by demultiplexing);
  first secondary decoding of the compressed intermediate data set to generate the reconstructed intermediate data set; and
  second secondary decoding of the compressed block evaluation data set to generate the block evaluation data set.

Again, in particular for the first and second secondary decoding, respectively, the algorithms corresponding to the first and second secondary coding (for example JPEG-LS and Huffman coding, etc.) are used. Accordingly, reference is made only to the above statements at this point, which also apply here analogously.

In a further aspect, the invention provides a (corresponding) system for decoding a compressed data set generated in particular by a coding method according to the invention, for generating an (approximately) reconstructed initial data set in which for each of a plurality of initial data points one reconstructed initial data value $P^*_1$, $P^*_2$, $P^*_3$, $P^*_4$ is specified, comprising:
  a secondary decoder for secondary decoding of the compressed data set to generate
    a reconstructed intermediate data set which specifies a plurality of intermediate data values; and
    a block evaluation data set which defines, for each intermediate data value, an assignment rule (a mapping) as to whether it represents a single initial data point of the initial data set to be reconstructed or a data point block comprising a plurality of initial data points of the initial data set to be reconstructed; and
  a primary decoder for primary decoding of the reconstructed intermediate data set to generate the reconstructed initial data set in accordance with the assignment rules defined in the block evaluation data set.

Preferably, the secondary decoder comprises:
  a demultiplexer (or more generally a separator module) for extracting (or separating) a compressed block evaluation data set and a compressed intermediate data set from the compressed data set;
  a first secondary decoder for first secondary decoding of the compressed intermediate data set to generate the reconstructed intermediate data set; and a second secondary decoder for second secondary decoding of the compressed block evaluation data set to generate the block evaluation data set.

Preferably, the system for decoding is designed to perform a method of decoding according to the present invention, in particular in one of the preferred embodiments described herein, and/or to decode a compressed data set generated by a method or system according to the present invention, in particular in one of the preferred embodiments described herein.

In another aspect, the invention provides a computer program product, in particular a data carrier and/or a signal sequence transmitted in a transmission line, which includes program code which, when loaded and executed in a computer system, enables or causes this computer system to perform a method according to the invention in particular in one of the preferred embodiments described herein.

Further details, in particular of preferred embodiments and implementations of the invention, will be described by way of example with reference to the accompanying drawings, which show:

FIG. 1 a block diagram for illustrating a method and a system for encoding according to a preferred embodiment of the present invention;

FIG. 2 a block diagram for illustrating a method and system for decoding according to a preferred embodiment of the present invention; and FIG. 3 schematic diagrams for illustrating contextual formulations and scan sequences according to preferred embodiments of the present invention.

FIG. 1 illustrates coding 100 according to a preferred embodiment of the present invention. Here, an original data set (for example an original photo) is assumed as the initial data set 110. This initial data set includes a plurality of initial data points 112. Each initial data point 112 may represent the location (coordinates) of a pixel of the original photo. Here, an initial data value $P_1$, $P_2$, ... is specified in the initial data set 110 for each initial data point 112. Depending on the information (e.g., photography, thermography, tomography, etc.) depicted by the initial data set 110, each initial data value represents corresponding information about a pixel (e.g., color, brightness) or a physical measured value (e.g., temperature, electric and/or magnetic field, etc.).

The initial data set 110 is encoded by the method illustrated in FIG. 1 to obtain a compressed data set 114. For this purpose, the method illustrated in FIG. 1 comprises primary coding, wherein first a plurality of data point blocks 118 are specified. For this purpose, the initial data points 112 (hereinafter also referred to simply as pixels for the sake of simplicity) are subdivided into individual blocks. In the embodiment illustrated in FIG. 1, these are blocks of 2×2 pixels. Each block contains 4 pixels. Preferably, the blocks do not overlap, so that preferably each pixel is associated with exactly one data point block 118.

A block data value 120 is then determined for each data point block 118 by means of a block value determination module 130, as a function of the four initial data values $P_1$, $P_2$, $P_3$ und $P_4$ of the pixels within the respective data point block 118. For example, the block data value can be determined as the mean value $P_m$ of all four values $P_1$, $P_2$, $P_3$ und $P_4$. This block data value $P_m$ thus represents the entire data point block 118, i.e. the data values of all four pixels at the same time. The way to judge whether the block data value $P_m$ is a sufficiently good representative for the entire data point block 118 will be described in the following for the preferred embodiment shown here.

A deviation determination module 134 shown in the embodiment of FIG. 1 is designed to determine, for each pixel, a deviation $D_1$, $D_2$, $D_3$, $D_4$ of the respective initial data value $P_1$, $P_2$, $P_3$ und $P_4$ from the block data value $P_m$, in particular as a difference $$D_i = |P_i - P_m| \text{ für } i = 1 \ldots 4 \quad (7)$$

In addition, in the illustrated embodiment, a tolerance value determination module 132 that determines a tolerance value 122 for each pixel of the initial data set 110 is provided. For example, equations (1) to (6d) above show the way in which corresponding tolerance values $JND_1$, $JND_2$, $JND_3$, $JND_4$ can be determined for the pixels of the data point block 118 shown in FIG. 1.

In particular on the basis of the tolerance values $JND_1$, $JND_2$, $JND_3$, $JND_4$ and the deviations $D_1$, $D_2$, $D_3$, $D_4$, a block evaluation module 136 determines whether the representative value sufficiently represents the entire data point block 118, and outputs the result as a block evaluation data set 124. Thus, for each data point block 118, the block evaluation data set 124 specified whether this data point block represents a particularly sensitive region (also called "region of interest" ROI). By means of this block evaluation data set 124, a composition module 138 is now controlled, which determines the creation or composition of an intermediate data set 116. In particular, the intermediate data set 116 is generated in such a way that for each sensitive region or data point block ROI it contains all initial data values $P_1$, $P_2$, $P_3$ und $P_4$ individually, and for each non-sensitive data point block (non-ROI) it contains only the block data value $P_m$ as a representative for the initial data values. For example, the content of the block evaluation data set 124 can be determined in accordance with the rule $$isROI = \begin{cases} 0, \text{ falls } D_1 < JND_1 \wedge D_2 < JND_2 \wedge D_3 < JND_3 \wedge D_4 < JND_4 \\ 1, \text{ ansonsten} \end{cases} \quad (8)$$

wherein the value "isROI" specifies whether the corresponding data point block is a sensitive data point block (isROI=1), i.e. does not comply with the tolerance criterion, or if it is a non-sensitive data point block (isROI=0), i.e. does comply with the tolerance criterion. Each data point block with isROI=0 is already compressed very effectively in this way, since in any case the intermediate data set 116 contains only a single value instead of four values for this purpose. This reduction in the amount of data is all the more pronounced the larger the proportion of non-sensitive data blocks and the larger the data blocks at the same time. However, since the probability that at least one initial data value is not within the required tolerance range in a data point block and the data point block is thus sensitive increases with the size of the data point blocks with a given tolerance criterion, these should not be chosen to be too large.

In the illustrated approach, however, the reduction of the amount of data by representing a whole group of pixels with only a single value in the intermediate data set is partially obstructed by the fact that, in addition to the pure data values in the intermediate data set 116, the block evaluation data set 124 also contains important information and has to be stored and transmitted. In particular, it is precisely defined therein which role the individual values in the intermediate data set 116 play, i.e. whether they each represent a single pixel or a whole group of pixels. The block evaluation data set is therefore necessary for the correct assignment of the values in the intermediate data set 116 to the pixels. However, a binary statement, i.e. a single bit per data point block, is sufficient for this in the block evaluation data set.

Preferably, the intermediate data set 116 and the block evaluation data set 124, before being combined to form the compressed data set 114, are encoded by means of a first secondary encoder 140 and a second secondary encoder 142, respectively. This creates a compressed intermediate data set 126 and a compressed block evaluation data set 128, which are preferably combined by a multiplexer 144 to form the compressed data set.

While the second secondary encoder 142 preferably operates losslessly so as not to lose any assignment information, at least small losses may be allowed in the first secondary encoder 140 in favor of a higher compression rate. For example, the second secondary encoder may operate on the basis of Huffman coding. The first secondary coding may be based on JPEG-LS coding, for example. Even for a lossy first secondary coding, the formation of artifacts can be suppressed by selecting the allowable losses to be correspondingly small. In combination with the primary coding, this results in a fairly good compression rate.

For lossy coding, JPEG-LS defines a parameter δ for the quantization, which represents a measure of the allowed error, i.e. the deviation of a reconstructed value from the original value. In JPEG-LS, the value for the parameter δ remains constant for a complete scan, i.e. for an entire image. In a preferred embodiment of the invention, however, the parameter δ is locally varied as a function of the block evaluation data set. Thus, a value isROI=0, i.e. a non-sensitive data block, is preferably understood as a region with a high quality requirement for quantization in the (first) secondary encoder. Thus, for example, the usually often troublesome artifact formation (e.g., stripe formation) of JPEG-LS in such regions can be suppressed. In JPEG-LS, for example, the quantization of a prediction residual E according to $$Q(\epsilon) = \text{sign}(\epsilon) \cdot \left\lfloor \frac{|\epsilon| + \delta}{2\delta + 1} \right\rfloor$$

is carried out.

According to a preferred embodiment of the invention, the quality losses can be locally controlled by the parameter δ being changed locally as a function of a pixel position i according to $$Q(\epsilon_i) = \text{sign}(\epsilon_i) \cdot \left\lfloor \frac{|\epsilon_i| + \delta_i}{2\delta_i + 1} \right\rfloor$$

This is particularly preferably carried out as a function of the block evaluation data set 124, for example according to $$\delta_i = \begin{cases} N, & \text{falls } i \in ROI\text{-Block} \\ \max\{N-3, 0\}, & \text{ansonsten} \end{cases}$$

For a very high quality coding, for example N=3 can be selected. In this case, the non-sensitive data point blocks (non-ROI) are compressed with δ=0, ie loss-free, while ROI areas are compressed with δ=3.

The block evaluation data set 124 thus plays a role not only in the assignment of the values in the intermediate data set 116 to the individual pixel positions, but also as a quality criterion for the quantization in the (first) secondary encoder 140. For this purpose, the block evaluation data set 124 is preferably supplied to the first secondary encoder 140, as also shown in FIG. 1. Although the quantization has been described in more detail on the basis of JPEG-LS in the example above, a corresponding quantization also plays a role in other lossy encoders and can be controlled there as a function of the block evaluation data set.

In particular if a first secondary coding on the basis of a JPEG-LS coding is used, the block evaluation data set can also be used for a definition of the environment or context of the individual pixels in addition to a control of the quantization. In particular, the JPEG-LS coding, like many other prediction based codings, uses information from the local environment of a pixel for predictions about the corresponding current pixel. In particular, however, if e.g. for storage and speed reasons it is intended to further expand all individual pixels from data point blocks in the first secondary encoder as well, it may be advantageous to the use of the established context formulation (e.g. local gradients) in the environment of the individual pixels to adjust the scan order. This becomes clear in particular with reference to FIG. 3. FIG. 3(a) shows a common scan sequence for prediction methods, as can be used in particular for JPEG-LS. FIG. 3(b) illustrates a common context rule according to which a local gradient for the current pixel is determined from reconstructed neighbor pixels already traversed in the scan order of FIG. 3(a). Basically, this rule of FIG. 3(c) can be applied analogously to a data set with lots of data point blocks instead of pixels.

However, if the intermediate data set 116 contains a combination of pixel values and block data values, a situation as shown in FIG. 3(d) may occur in the scan sequence according to FIG. 3(a), in which the gradient formation can no longer access already traversed pixels or data point blocks. For this reason, it is suggested that the scanning order be modified at least when using 2×2 blocks according to FIG. 3(e). For other sizes or shapes the data point blocks, the scan order can be adjusted accordingly to perform a prediction also according to the examples of FIGS. 3(f) and 3(g) using the established context rules.

FIG. 2 illustrates decoding 200 according to a preferred embodiment of the present invention. Insofar as elements occur analogously to corresponding elements in coding 100 according to FIG. 1, these are used with the same reference numerals. In particular, the compressed data set 114 generated during coding is taken as a basis here. It is preferably decomposed into the compressed block evaluation data set 128 and the compressed intermediate data set 126 in a demultiplexer 210 again. While the compressed intermediate data set 126 is being decoded in a first secondary decoder 212 to yield a reconstructed intermediate data set 214, the block evaluation data set 124 is preferably retrieved from the compressed block evaluation data set 128 by means of a second secondary decoder 216. It is preferably identical or at least identical in content to the block evaluation data set 124 generated during coding. Depending on the first secondary coding or decoding method, the reconstructed intermediate data set 214 may (slightly) differ from the intermediate data set 116 generated during coding, in particular if the first secondary encoder 140 applies a lossy coding algorithm.

As described above, since the block evaluation data set 124 contains all the necessary information for assigning the data contents of the intermediate data set 116 and thus also of the reconstructed intermediate data set 214 to individual initial data points or data point blocks in the initial data set 110 and thus also in an initial data set 220 to be reconstructed, a primary decoder 218 can generate the initial data set 220 to be reconstructed.

Thus, the invention provides very simple and thus fast coding and decoding, in which even with high quality requirements a good compression ratio is achieved in particular for a visual representation.

100 coding method
110 initial data set
112 initial data points
114 compressed data set
116 intermediate data set
118 data point block
120 block data value
122 tolerance value
124 block evaluation data set
126 compressed intermediate data set
128 compressed block evaluation data set
130 block value determination module
132 tolerance value determination module
134 deviation determination module
136 block evaluation module
138 composition module
140 first secondary encoder
142 second secondary encoder
144 multiplexer
210 demultiplexer
212 first secondary decoder
214 reconstructed intermediate data set
216 second secondary decoder
218 primary decoder
220 decoded data set (reconstructed initial data set)

The invention claimed is:
1. A computer implemented method for encoding an initial data set, in which an initial data value (P1, P2, P3, P4) is specified for each of a plurality of initial data points, for generating a compressed data set, comprising:
    primary coding of the initial data set for generating an intermediate data set, comprising:

specifying a plurality of data point blocks that each comprise a plurality of initial data points of the initial data set;
determining a block data value for each data point block from the plurality of initial data values (P1, P2, P3, P4) within the respective data point block;
checking each data point block for compliance with a tolerance criterion; and
generating the intermediate data set such that the intermediate data set, for each data point block in which the tolerance criterion is met, contains the block data value as a single data value, and for each data point block in which the tolerance criterion is not met, contains the individual initial data values (P1, P2, P3, P4) at the initial data points of the respective data point block; and
secondary coding of the intermediate data set for generating the compressed data set.

2. The method according to claim 1, wherein checking each data point block for compliance with the tolerance criterion comprises:
determining a tolerance value for each initial data point;
determining a reference value for each initial data point as a function of the determined block data values of the respective data point block; and
checking each initial data point within the data block as to whether a deviation (D1, D2, D3, D4) of the associated initial data value from the respective reference value is within the respective tolerance value.

3. The method according to claim 2, wherein determining a tolerance value for each initial data point is effected as a function of the initial data values of at least 8.

4. The method according to claim 2, wherein for each data point block the block data value is used as a reference value for each initial data point within the respective data point block.

5. The method according to claim 1, wherein each data point block comprises n×n initial data points, where n is a natural number greater than or equal to 2.

6. The method according to claim 1, wherein checking each data point block for compliance with a tolerance criterion comprises generating a block evaluation data set that specifies for each data point block whether the tolerance criterion is met or not.

7. The method according to claim 6, wherein secondary coding of the intermediate data set for generating the compressed data set comprises:
first secondary coding of the intermediate data set for generating a compressed intermediate data set;
second secondary coding of the block evaluation data set for generating a compressed block evaluation data set; and
multiplexing of the compressed intermediate data set with the compressed block evaluation data set for generating the compressed data set.

8. The method according to claim 6, wherein secondary coding of the intermediate data set comprises lossy compression by quantization with a local quantization error determined for each data point block as a function of the block evaluation data set.

9. A method of decoding a compressed data set generated by the method according to claim 1, for generating a reconstructed initial data set, in which a reconstructed initial data value (P*1, P*2, P*3, P*4) is specified for each of a plurality of initial data points, comprising:
secondary decoding of the compressed data set for generating
a reconstructed intermediate data set specifying a plurality of intermediate data values; and
a block evaluation data set which specifies, for each intermediate data value, an assignment rule as to whether it represents a single initial data point of the initial data set to be reconstructed or a data point block, which comprises a plurality of initial data points of the initial data set to be reconstructed; and
primary decoding of the reconstructed intermediate data set for generating the reconstructed initial data set in accordance with the assignment rules defined in the block evaluation data set.

10. The method according to claim 9, wherein the secondary decoding comprises:
extracting a compressed block evaluation data set and a compressed intermediate data set from the compressed data set;
first secondary decoding of the compressed intermediate data set for generating the reconstructed intermediate data set; and
second secondary decoding of the compressed block evaluation data set for generating the block evaluation data set.

11. A system for encoding an initial data set, in which an initial data value (P1, P2, P3, P4) is specified for each of a plurality of initial data points, for generating a compressed data set, comprising:
a primary encoder for encoding the initial data set for generating an intermediate data set, comprising:
a block generation module for specifying a plurality of data point blocks that each comprise a plurality of initial data points of the initial data set;
a block value determination module for determining a block data value for each data point block from the plurality of initial data values (P1, P2, P3, P4) within the respective data point block;
a block check module for checking each data point block for compliance with a tolerance criterion; and
a composition module for generating the intermediate data set in such a way that the intermediate data set, for each data point block in which the tolerance criterion is met, contains the block data value as a single data value, and for each data point block in which the tolerance criterion is not met, contains the individual initial data values (P1, P2, P3, P4) at the initial data points of the respective data point block; and
a secondary encoder for encoding the intermediate data set for generating the compressed data set.

12. The system according to claim 11, which is adapted to carry out a method according to claim 1.

13. A system for decoding a compressed data set generated using the method according to claim 1, for generating a reconstructed initial data set, in which a reconstructed initial data value (P*1, P*2, P*3, P*4) is specified for each of a plurality of initial data points, comprising:
a secondary decoder for secondary decoding of the compressed data set for generating
a reconstructed intermediate data set specifying a plurality of intermediate data values; and
a block evaluation data set which specifies, for each intermediate data value, an assignment rule as to whether it represents a single initial data point of the initial data set to be reconstructed or a data point block, which comprises a plurality of initial data points of the initial data set to be reconstructed; and
a primary decoder for primary decoding of the reconstructed intermediate data set for generating the reconstructed initial data set in accordance with the assignment rules defined in the block evaluation data set.

14. The system according to claim 13, wherein the secondary decoder comprises:
 a demultiplexer for extracting a compressed block evaluation data set and a compressed intermediate data set from the compressed data set;
 a first secondary decoder for first secondary decoding of the compressed intermediate data set for generating the reconstructed intermediate data set; and
 a second secondary decoder for second secondary decoding of the compressed block evaluation data set for generating the block evaluation data set.

* * * * *